(12) United States Patent
Pernu et al.

(10) Patent No.: US 9,568,144 B2
(45) Date of Patent: Feb. 14, 2017

(54) SYSTEM FOR ATTACHING A MODULE TO AN OBJECT

(71) Applicant: SUUNTO OY, Vantaa (FI)

(72) Inventors: Kimmo Pernu, Vantaa (FI); Tapio Selby, Vantaa (FI); Timo Yliluoma, Helsinki (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 13/832,020

(22) Filed: Mar. 15, 2013

(65) Prior Publication Data

US 2014/0013545 A1    Jan. 16, 2014

Related U.S. Application Data

(60) Provisional application No. 61/670,621, filed on Jul. 12, 2012.

(51) Int. Cl.

| F16M 13/02 | (2006.01) |
|---|---|
| F16M 11/04 | (2006.01) |
| F16M 13/00 | (2006.01) |
| A45F 5/02 | (2006.01) |

(52) U.S. Cl.
CPC .............. *F16M 13/02* (2013.01); *A45F 5/02* (2013.01); *F16M 11/041* (2013.01); *F16M 13/00* (2013.01); *Y10T 24/1397* (2015.01)

(58) Field of Classification Search
CPC ...... F16M 13/02; F16M 11/041; F16M 13/00; A45F 5/02; Y10T 24/1397
USPC ........................................ 24/3.12, 3.13, 459
See application file for complete search history.

(56) References Cited

U.S. PATENT DOCUMENTS

| 1,056,020 | A | * | 3/1913 | Graham ........................ 24/327 |
| 1,399,730 | A | * | 12/1921 | Abe ....................... A41F 19/005 |
| | | | | 24/114.12 |
| 4,175,305 | A | * | 11/1979 | Gillis ............................. 24/459 |
| 5,033,170 | A | * | 7/1991 | Ewert ............................ 24/459 |
| 5,046,222 | A | * | 9/1991 | Byers et al. .................... 24/343 |
| 5,557,830 | A | * | 9/1996 | Davis ............................. 24/459 |
| 5,655,271 | A | | 8/1997 | Maxwell-Trumble et al. |
| 6,449,810 | B1 | * | 9/2002 | Kuwayama ................. 24/115 H |
| 6,543,094 | B2 | * | 4/2003 | D'Addario ................. 24/16 PB |
| 6,718,600 | B1 | * | 4/2004 | Gillis ............................. 24/459 |
| 7,784,158 | B2 | * | 8/2010 | Doyle ........................ 24/114.12 |
| 8,327,510 | B2 | * | 12/2012 | Schlesinger ................... 24/459 |
| D700,864 | S | * | 3/2014 | Pernu et al. ................. D11/220 |

(Continued)

FOREIGN PATENT DOCUMENTS

| CN | 102932503 A | 2/2013 |
| DE | 9409886 U1 | 8/1994 |

(Continued)

*Primary Examiner* — Robert J Sandy
*Assistant Examiner* — Louis Mercado
(74) *Attorney, Agent, or Firm* — Terence P. O'Brien; Seppo Laine Oy

(57) ABSTRACT

A system for attaching a module to an object includes a module having an oblong shape, and an elastic ring. Each elongated end of the module has a recess with an interior surface formed by an upper and lower lip, and the distance between the interior surfaces of the recesses is substantially equal to the inner diameter of the elastic ring such that the module can be releasably affixed to the elastic ring. The system provides easy and reliable attachment of the module to a piece of clothing, for example.

18 Claims, 6 Drawing Sheets

(56) References Cited

U.S. PATENT DOCUMENTS

| | | | |
|---|---|---|---|
| D701,140 S | * | 3/2014 | Pernu et al. .................. D11/220 |
| 2005/0227533 A1 | | 10/2005 | Gartrell |
| 2008/0047110 A1 | | 2/2008 | Doyle |
| 2011/0297578 A1 | | 12/2011 | Stiehl |
| 2012/0081852 A1 | | 4/2012 | Maravilla |

FOREIGN PATENT DOCUMENTS

| | | |
|---|---|---|
| DE | 10259121 A1 | 11/2003 |
| GB | 2266236 A | 10/1993 |
| JP | 1131674 A | 5/1989 |

* cited by examiner

SYSTEM FOR ATTACHING A MODULE TO AN OBJECT

FIELD OF THE INVENTION

The present invention relates to accessories. In particular, the invention relates to a system for attaching a module to an object such as an article of clothing, e.g. attaching a GPS module to a sleeve. More specifically, the invention relates to a system according to the preamble portion of claim 1.

BACKGROUND OF THE INVENTION

There have been a number of methods for attaching an accessory, for example electronic modules such as GPS modules, electronic music players, sensors, etc., to objects. Examples of such methods usually include inserting the accessory into some sort of a pouch which is in turn attached to a strap or article of clothing that can then be worn by a user. These prior art methods have several disadvantages. For example, the need for a pouch with the proper dimensions for the accessory, e.g. if the user dislikes or loses a pouch which comes with their object it can be difficult to find a replacement with the same dimensions. Additionally, users typically like compact accessories where considerable design effort goes in to making the accessory small only to end up having to place the accessory in to a bulky pouch, device or pocket in order to utilize the accessory.

The aim of the present invention is to provide a universal method of attaching an accessory, such as an electronics module, to an object, such as a user's person or clothing.

SUMMARY OF THE INVENTION

It is an object of the present invention to provide a universal system and method for attaching an accessory to an object. Examples of accessories are modules, such as electronic modules. For instance, the module can be a GPS module. Examples of Objects are a user's person, straps, or articles of clothing.

It is an aspect of certain embodiments of the present invention to provide a system comprising a module, for instance one having an oblong shape, and an elastic ring.

It is a further aspect of certain embodiments that at least one elongated end of a module has a recess. The recess can be defined as having an interior surface formed by an upper and lower lip. Furthermore, the distance between the centres of the interior surfaces of the recesses at each end is substantially equal to the diameter of the elastic ring. As such, the module can be releasably affixed to the elastic ring.

According to certain embodiments of the present invention, an oblong shaped module can have a recess at each elongated end. The recesses can be substantially the same or, for instance, one end can have a recess which is greater in depth than the other. Similarly, a recess, which is defined by an interior surface between an upper and lower lip, can have an upper lip of greater or lesser dimensions, such as length, protrusion, etc., compared to the lower lip. Furthermore, recesses at opposite elongated ends may be similar or different in design.

A module, or casing for a module, having a design in accordance with the present invention allows for universal attachment to objects such as straps and clothing. For example, a module having recesses for accepting the elastic ring can be placed against one side of a piece of material. The elastic ring can be placed on the opposite side of the material and pushed in to the recesses of the module, thus trapping a portion of the material in the recess as well. The result is that the module is releasably attached to the material without the need for a secondary device such as a pouch. This allows a user, for example, to gain the maximum benefit from the ergonomic and geometric design of the module. Additionally, the user can easily move the module from one object to another.

Another use of the present invention is for attaching a module to a strap. Similar to attaching the module to an actual article of clothing worn by a user, the module can be attached to a strap which is worn around, for example, the arm of a user. The strap may be placed on a user's arm and then the ring placed on one side of the strap and the module on the opposite. In such a use, the strap, being thinner than the width of the module, can pass between the opening formed by the sides of the module and the ring when the ring is then pushed in to the recesses of the module. The result is that the module is releasably attached to the user's arm, via a strap, without the need for a pouch designed for, and adding bulkiness to, the module. Additionally, in such a use no material is trapped between the module and the ring within the recess.

BRIEF DESCRIPTION OF DRAWINGS

In the following, exemplary embodiments of the invention are described in greater detail with reference to the accompanying drawings, in which.

DETAILED DESCRIPTION OF EXEMPLARY EMBODIMENTS

Figure 1:
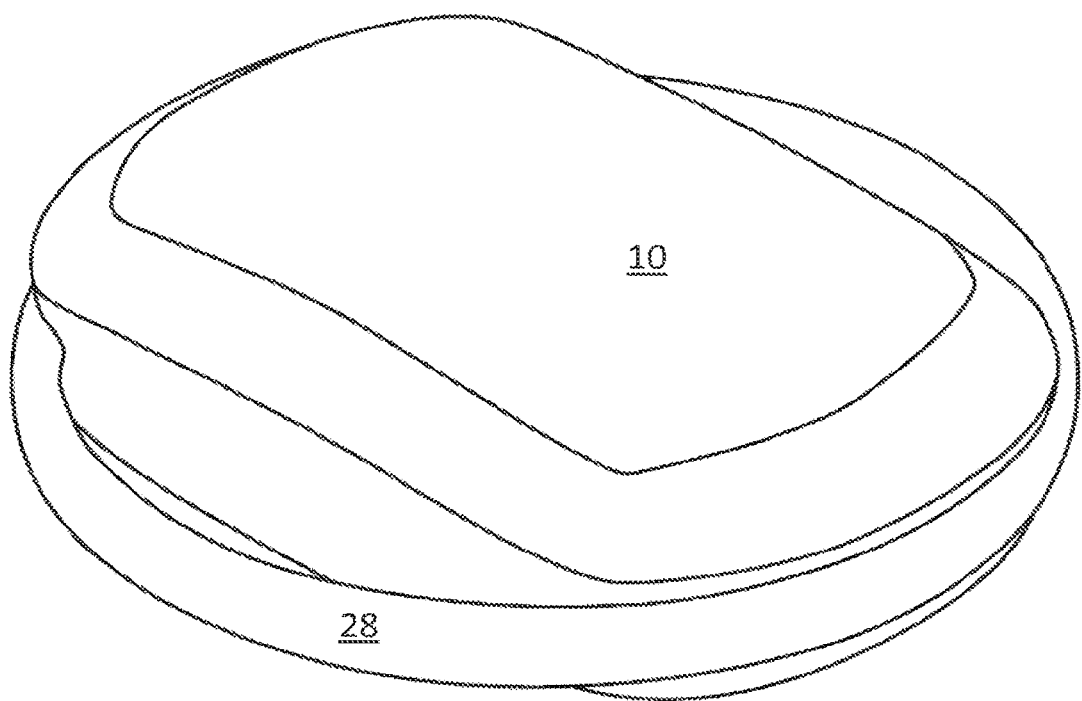
FIG. 1 shows an isometric projection of a module releasably affixed to an elastic ring.
Figure 2:
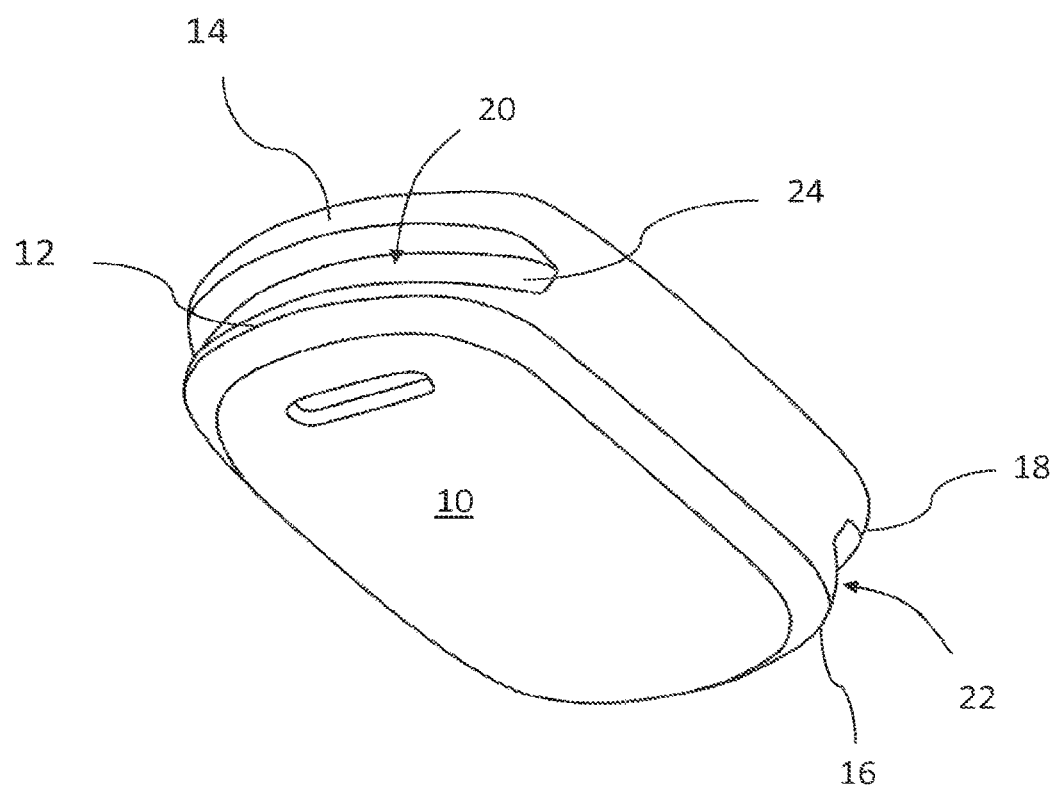
FIG. 2. shows an isometric projection of the module of FIG. 1 with lipped recesses at each end.

FIG. 1 illustrates one exemplary embodiment in which a system is provided for attaching a module 10 to an object with an elastic ring 28. The module 10 preferably has an oblong shape forming two elongated ends. At least one, and in the present example each, elongated end of the module 10 has a recess 20, 22, as shown in FIG. 2.

The recess is formed by an upper lip 14, 18 and lower lip 12, 16. The distance between the interior centres of the recesses 20,22, i.e. the length between the recesses, is substantially equal to the diameter of the elastic ring 28. As such, the module 10 can be releasably affixed to the elastic ring 28.

Figure 3:
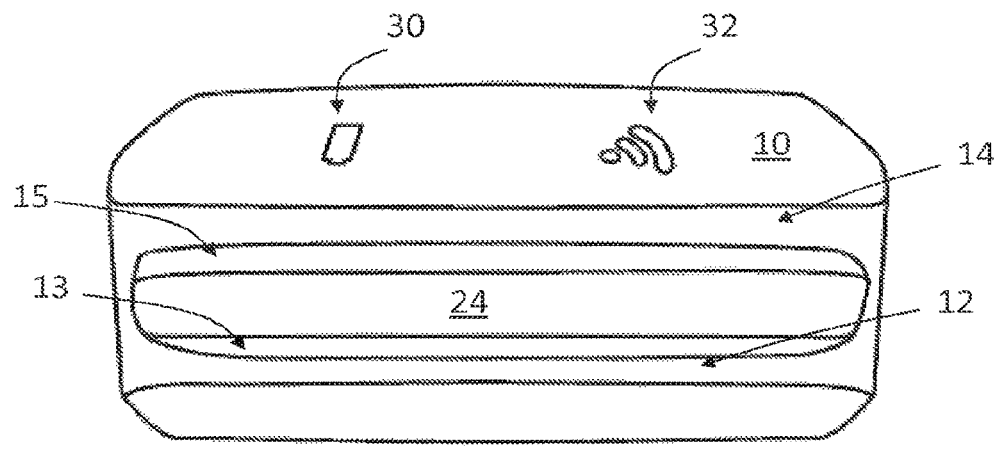
FIG. 3 shows an orthographic projection of one recessed end of the module of FIG. 1.

According to the present example, recesses 20, 22 extend the entire width of the end of the module 10. As shown in FIG. 3, the recess 20 is defined by an upper wall 15 corresponding to the upper lip 14 and a lower wall 13 corresponding to the lower lip 12. At the base of the upper wall 15 and the base of the lower wall 13, i.e. between the upper 14 and lower lips 12 is an interior surface 24. In the present example, the interior surface 24 has an arc corresponding to the normal arc of the elastic ring 28.

According to certain embodiments, the elastic ring has a normal, i.e. unstretched and uncompressed, diameter substantially equal to the width between the midpoints of each recess. In the case of only one recess then the normal diameter of the elastic ring is correspondingly between the midpoint of the recess and the corresponding opposite portion of the module.

The function of the ring is such that when it is in place within the, or both, recesses that the ring will hold the module while experiencing expected forces, e.g. the forces associated with being attached to an article of clothing or strap while attached to a user's body during exercise or outdoor activity. Once it is desired to release the module from an object then the sides of the ring which are not within the recess can be compressed by manual force in order to release the ring from the module.

As such, the smaller the normal diameter of the elastic ring 28 is compared to the distance between the midpoints of the recesses, the tighter the fit of the ring. Therefore, the normal diameter of the ring can be slightly larger or smaller than said distance.

Similarly, the arc of the interior surface 24 can be substantially equal to the arc of the ring while in place within the recess.

According to certain examples, for a module which is meant to be attached primarily to a strap, and as such would not normally have material present between the ring 28 and the interior surface 24 of the recess, then the normal diameter of the ring can be slightly or even perceptively smaller than the distance between the midpoints of the interior surfaces of the two recesses. Likewise, for a module which is meant to be attached primarily to an article of clothing, such as the sleeve or a shirt or leg of shorts, and as such would normally have material present between the ring 28 and the interior surface 24 of the recess, the normal diameter of the ring may be substantially equal or slightly larger than the distance between the midpoints of the interior surfaces of the two recesses to account for the material.

In order to provide the best fit for multiple scenarios, a system may comprise a module and more than one elastic ring, wherein at least two of the elastic rings have different diameters and/or elasticities in order to account for different uses, such as those outlined above.

According to certain examples, the upper wall 15 and the lower wall 13 of the recess 20 can be diverging, e.g. one or both of the walls can have an obtuse angle with respect to the merger with the interior surface. It is also possible that one or both of the upper and lower walls is perpendicular to the interior surface 24 of the recess 20. Furthermore, either or both of the upper and lower walls may be straight or may have some curvature.

According to an embodiment, one or both of the upper and lower walls, or portion of the upper and low lips, may include an inward protrusion (not shown) at some distance from the interior surface 24. The protrusion may be at any point between the interior surface and the distal most portion of the upper or lower lip, or upper or lower wall. The protrusion can be located at or towards the distal portion in order to act as a prevention mechanism for the ring slipping over said end or wall. As such, the elastic ring would fit between the protrusion and the interior surface. Additionally, a protrusion may be located at a point along the upper and/or lower wall which fits into, for example a matching dimple or groove in an elastic ring.

The upper and lower wall of each recess in the present example are the same length, i.e. the distance between the interior surface 24 of recess 20 and 26 (not shown) of recess 22, and the ends of the upper lips 14, 18 and lower lips 12, 16 respectively are substantially equal.

According to certain examples however, the upper lip of a recess, which corresponds, for example, to a top portion of a module is 5-50%, preferably 10-30%, more preferably 15-20% longer than the lower lip of the recess, which corresponds to the bottom portion of the module.

Similarly, it is possible that the lower lip of a module is 5-50%, preferably 10-30%, more preferably 15-20% longer than the upper lip of the recess.

The description above is generally describing the construction and attributes of a recess of a module according to the present invention. As indicated above, a module may have one, two or potentially an even greater number of recess. Each recess may be constructed according to the description above. For a module having two recesses, for example at opposite ends of the module as shown in the FIGS. 1-7, the recesses may be constructed similarly, identically or differently.

For instance, one end may have a deeper first recess where a ring can initially be placed and then pivotally pushed into a shallower second recess at the opposite end. The first recess may have perpendicular walls of equal length and the second recess may have, for example, a perpendicular upper wall and a divergent lower wall to accommodate the pivotal entrance of the ring into the second recess. One of ordinary skill will recognize countless variations and combinations of recesses which are not enumerated herein but which none the less do not depart from the scope of the present invention.

According to certain examples, the distance between the centres of the interior surfaces 24, 26 i.e. the length between the recesses of the first and second ends is between ±5% of the normal diameter of the ring 28. One example provides that the span of the short width of the oblong module 10 is 5-50%, preferably 10-30%, more preferably 15-20% smaller than the normal diameter of the ring 28.

Figure 4:
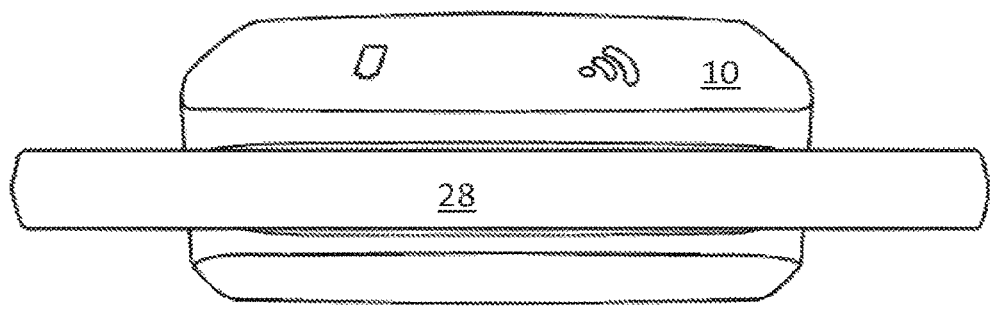
FIG. 4 shows an orthographic projection of one recessed end of the module of FIG. 1 releasably affixed to the elastic ring of FIG. 1.
Figure 5:
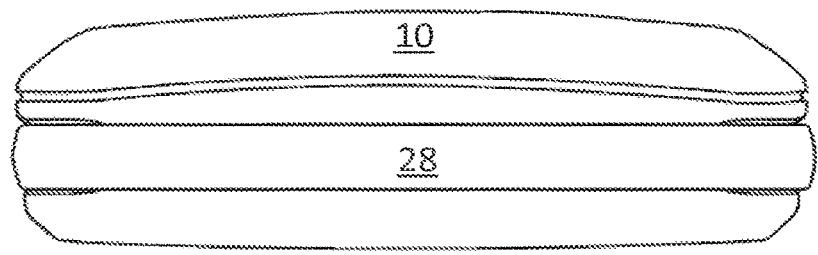
FIG. 5 shows an orthographic projection of one long end of the module of FIG. 1 releasably affixed to the elastic ring of FIG. 1.
Figure 6:
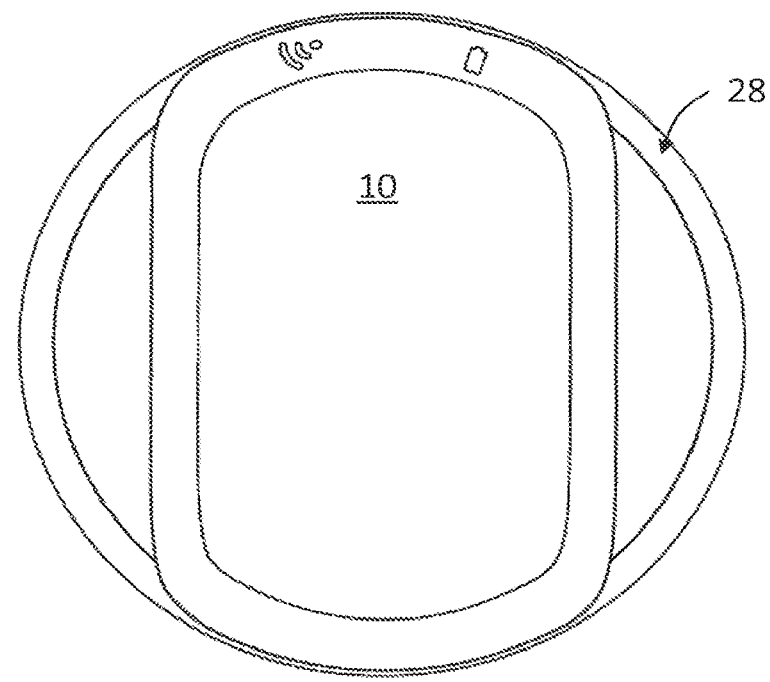
FIG. 6 shows a plan view of the module of FIG. 1 releasably affixed to the elastic ring of FIG. 1.

According to certain examples, the module 10 is an electronics module. The electronics module may contain for example at least one sensor, a battery and a transmitter. An exemplary example is that the electronics module 10 is a GPS module. Furthermore, an electronics module may include one or more indicators on a portion, for example the top, of the module as shown in FIGS. 3 and 4. The module may include, for example, a battery indicator 30 and a signal strength indicator 32. One of ordinary skill in the art will recognize countless other indicators, buttons, displays, interfaces, logos, designs, trademarks, etc. which may be added to one or more portions of the module.

Figure 7:
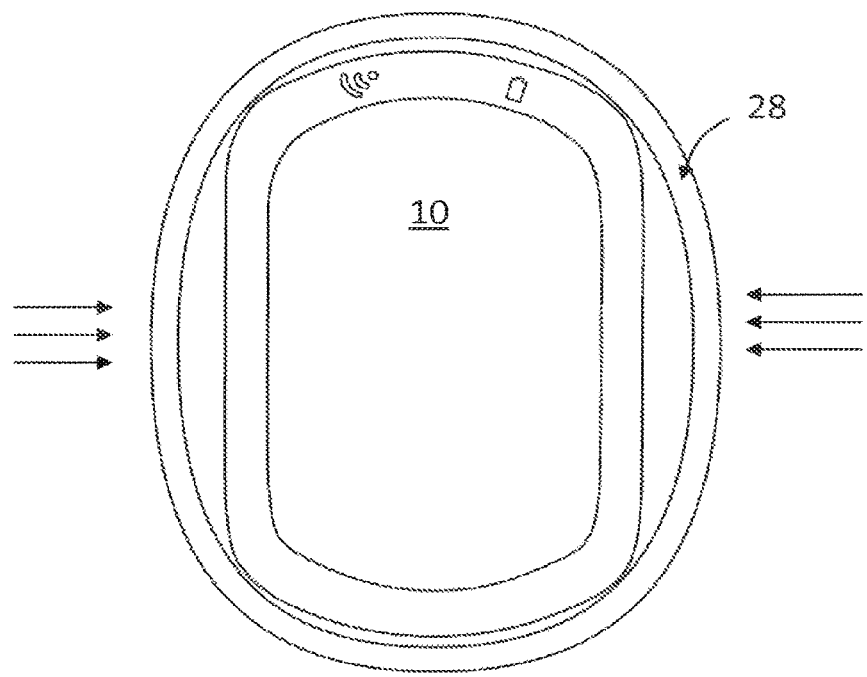
FIG. 7 shows a plan view of the elastic squeezed ring of FIG. 1 releasing from or affixing to a module.
Figure 8:
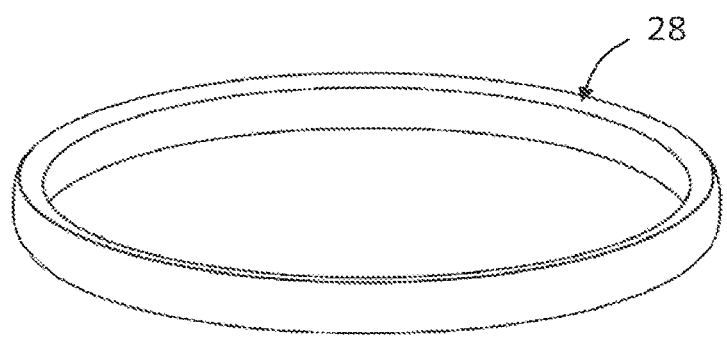
FIG. 8 shows an isometric projection of the elastic ring.

Generally, the function of the elastic ring is to hold the module in place with respect to an object. As such, the elastic ring needs to have material properties, stiffness and resilience, capable of withstanding the typical forces to be experienced when the module is in place on the object so that it does not inadvertently release the module during normal activity. However, the elastic ring should be elastic enough that by compressing the sides of the ring not in the recesses, as shown in FIG. 7, the ends in the recess deform enough that the ring can be released from the module. As such, according to certain examples the elastic ring 28, shown in FIG. 8, is made of suitable plastics or metals.

Examples of some suitable materials are glass fiber reinforced polyamide or plain, unreinforced, Polyamide. Typical Young's modulus for such suitable materials range from, for example 1000-3300 MPA, preferably between 1100-3000MPa, more preferably between 1100-2000 MPa or 2000-3000 MPa. However, one of ordinary skill will recognize materials with Young's modulus within and/or near said ranges which are capable of fulfilling the properties of an elastic ring according to the present invention without departing from the scope of the present invention.

According to one example, the system can be used as follows: the ring 28 is placed on a user's arm and a strap is placed over the ring 28 and tightened to the user's arm. A GPS module 10 is then inserted into the ring 28, the ring 28 entering the recesses 20, 22 between the upper 14, 16 and lower 12, 18 lips. The GPS module 10 inserted into the ring 28 affixes the strap to the ring 28 and this in turn affixes the GPS module 10 to the user. The GPS module 10 can be released from the ring 28, by squeezing the ring 28 along the long sides of the module 10 thus moving the ring 28 out from its position against the interior surface 24, 26 allowing the module 10 to be lifted clear of the ring 28.

Similarly, the system can be used in the reverse, such that the GPS module 10 is first placed against the user's arm, the strap placed over the GPS module and the ring then affixed to the GPS module.

Figure 9:
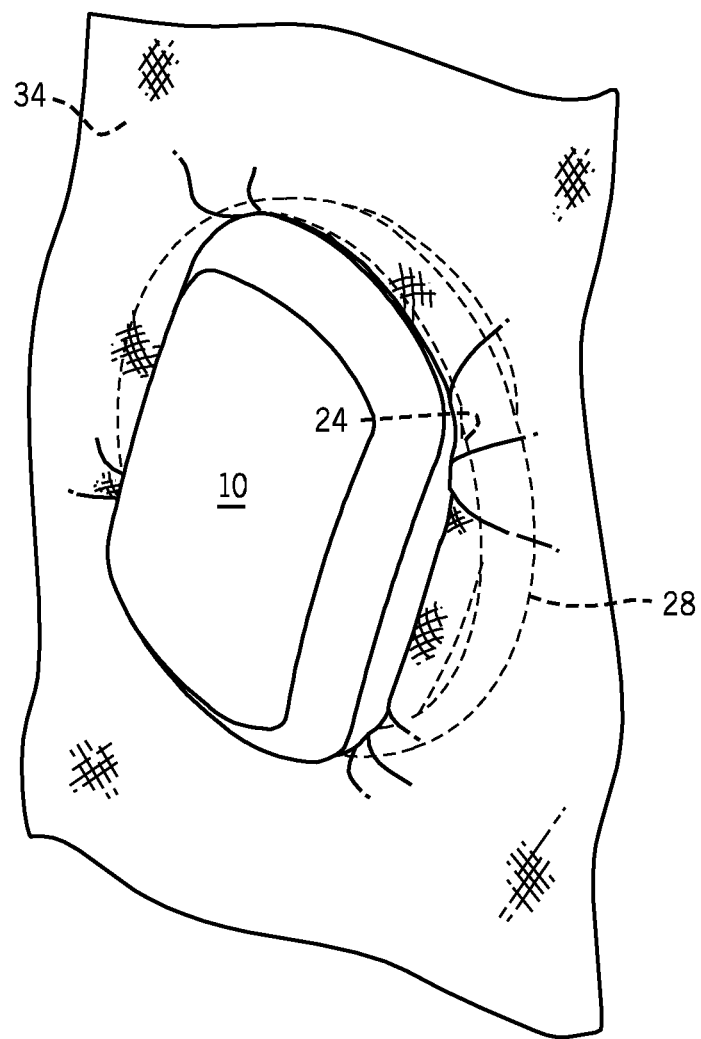
FIG. 9 shows a front perspective view a module and a ring attached to a sheet of material.

Referring to FIG. 9, according to another example, a GPS module 10 is placed on one side of a piece of material 34, for instance the inside of the sleeve of a shirt, either while the shirt is on a user or prior to putting on the shirt. The ring 28 is then placed in to the recesses 24 of the module 10 from the opposite side of the material 34, effectively trapping a portion of the material 34 between the ring 28 and one or both of the interior surfaces of the recesses 24. Similarly, the system can be used in the reverse, such that the ring is placed on the interior portion of a sleeve and the GPS module is placed on the outside and pushes the ring in to the recess(es).

Several examples and embodiments have been presented herein to describe aspects of the present invention. One of ordinary skill in the art will recognize that the present invention is not limited to the explicit examples and embodiments presented herein but that combinations and variations not explicitly disclosed herein none the less do not depart from the scope of the present invention.

TABLE 1

List of reference numbers.

| Number | Part |
|---|---|
| 10 | Module |
| 12 | Lower Lip of recess 20 |
| 13 | Lower Wall of recess 20 |
| 14 | Upper Lip of recess 20 |
| 15 | Upper Wall of recess 20 |
| 16 | Lower Lip of recess 22 |
| 18 | Upper Lip of recess 22 |
| 20 | Recess |
| 22 | Recess |
| 24 | Interior Surface of recess 20 |
| 26 | Interior Surface of recess 22 |
| 28 | Elastic Ring |
| 30 | Battery indicator |
| 32 | Signal indicator |

The invention claimed is:

1. An electronics module attachment system for use with a piece of material, the system comprising;

an electronics module having an oblong shape forming first and second elongated ends, each of the first and second ends including an upper lip, a lower lip and an interior surface between the upper and lower lips, the upper and lower lips having upper and lower walls, respectively, the upper and lower walls and the interior surface defining a recess, the interior surface of the first end and the interior surface of the second end defining a distance measured along a central longitudinal dimension of the electronics module, the upper and lower lips defining outer end surfaces, the recess having a recess depth measured with respect to the central longitudinal dimension from the interior surface to the outer end surface, the upper and lower walls diverging from the interior surface toward the outer end surfaces, the interior surface being substantially parallel to the outer end surfaces at the central longitudinal dimension, and an elastic ring defining an inner diameter and having a radial thickness, the ring being removably attachable to the piece of material and the ring by trapping a portion of the material between the ring and the first and second ends of the electronics module, the distance between the interior surfaces of the recesses being substantially equal to the inner diameter of the elastic ring, the recess depth being sufficient to receive at least half of the radial thickness of the ring.

2. The system of claim 1, wherein the first and second ends define first and second widths, and wherein the recess of at least one of the first and second ends extends entirely the width of the end.

3. The system of claim 1, wherein the interior surface has a curvature that corresponds to a curvature of the elastic ring.

4. The system of claim 1, wherein the upper and lower walls are diverging from each other.

5. The system of claim 1, wherein at least one of the upper and lower walls is outwardly curved from the recess.

6. The system of claim 1, wherein the upper and lower walls each have a height measured with respect to the central longitudinal dimension, and wherein the height of the upper and lower walls are substantially equal.

7. The system of claim 1, wherein the distance between the interior surfaces of the first and second ends is between plus or minus 5% of the inner diameter of the ring.

8. The system of claim 1, wherein the ring is releasably affixed to the module without a locking means.

9. The system of claim 1, wherein the recess depth is substantially equal to the radial thickness of the ring.

10. The system of claim 1, wherein at one of the upper and lower walls define an obtuse angle with respect to the interior surface.

11. A module attachment system for use with a piece of material, the system comprising;

a module having an oblong shape forming first and second elongated ends, each of the first and second ends including an upper lip, a lower lip and an interior surface between the upper and lower lips, the upper and lower lips having upper and lower walls, respectively, the upper and lower walls and the interior surface defining a recess, the interior surface of the first end and the interior surface of the second end defining a distance measured along a central longitudinal dimension of the module, the upper and lower lips defining outer end surfaces, the recess having a recess depth measured with respect to the central longitudinal dimension from the interior surface to the outer end surface, the upper and lower walls diverging from the interior surface toward the outer end surfaces, the interior surface being substantially parallel to the outer end surfaces at the central longitudinal dimension, and an elastic ring defining an inner diameter and having a radial thickness, the ring being removably attachable to the piece of material and the ring by trapping a portion of the material between the ring and the first and second ends of the module, the distance between the interior surfaces of the recesses being substantially equal to the inner diameter of the elastic ring, the recess depth being sufficient to receive at least half of the radial thickness of the ring, the ring being releasable from the module when portions of the ring not engaged with the module are squeezed toward each other.

12. The system of claim 11, wherein the first and second ends define first and second widths, and wherein the recess of at least one of the first and second ends extends entirely the width of the end.

13. The system of claim 11, wherein the interior surface has a curvature that corresponds to a curvature of the elastic ring.

14. The system of claim 11, wherein the upper and lower walls are diverging from each other.

15. The system of claim 11, wherein at least one of the upper and lower walls is outwardly curved from the recess.

16. The system of claim 11, wherein the upper and lower walls each have a height measured with respect to the central longitudinal dimension, and wherein the height of the upper and lower walls are substantially equal.

17. The system of claim 11, wherein the recess depth is substantially equal to the radial thickness of the ring.

18. The system of claim 11, wherein at one of the upper and lower walls define an obtuse angle with respect to the interior surface.

* * * * *